US006761630B1

(12) United States Patent
Schwinn et al.

(10) Patent No.: US 6,761,630 B1
(45) Date of Patent: Jul. 13, 2004

(54) METHOD OF OPERATION OF A SIEVE ADJUSTMENT CONTROL SYSTEM FOR AN AGRICULTURAL COMBINE

(75) Inventors: Kevin S. Schwinn, Orion, IL (US); Christopher A. Brubaker, Davenport, IA (US)

(73) Assignee: Case, LLC, Racine, WI (US)

( * ) Notice: Subject to any disclaimer, the term of this patent is extended or adjusted under 35 U.S.C. 154(b) by 34 days.

(21) Appl. No.: 10/361,900

(22) Filed: Feb. 10, 2003

(51) Int. Cl.[7] .......... A01F 12/32

(52) U.S. Cl. .......... 460/101

(58) Field of Search .......... 460/101, 69, 99, 460/72, 109, 5, 2; 56/10.2 R, 14.6; 209/394

(56) References Cited

U.S. PATENT DOCUMENTS

| | | | | |
|---|---|---|---|---|
| 3,114,870 A | | 12/1963 | Moser et al. | 318/28 |
| 3,127,546 A | | 3/1964 | Moser et al. | 318/28 |
| 3,355,642 A | | 11/1967 | Leehouts | 318/28 |
| 4,466,231 A | | 8/1984 | Rowland-Hill et al. | 56/10.2 |
| 4,527,241 A | * | 7/1985 | Sheehan et al. | 701/50 |
| 4,897,071 A | * | 1/1990 | Desnijder et al. | 460/10 |
| 6,119,442 A | | 9/2000 | Hale | 56/10.2 |
| 6,205,384 B1 | | 3/2001 | Diekhans | 701/50 |
| 6,632,136 B2 | * | 10/2003 | Anderson et al. | 460/101 |

* cited by examiner

*Primary Examiner*—Árpád Fab Kovács
(74) *Attorney, Agent, or Firm*—John William Stader; Collin A. Webb

(57) ABSTRACT

An adjustment control system for a grain cleaning sieve or sieves of an agricultural combine, a method of automatic operation of a sieve control system for adjusting the sieve opening size or position while mitigating error and inaccuracy resulting from tolerance stack-up of mechanical components in the system.

23 Claims, 4 Drawing Sheets

START 62
IS THERE AN OPEN OR CLOSE COMMAND PRESENT? 64
IS SEPERATOR OPERATING? 66
IS STORED POS. VALUE = ACTUAL ? 80
A
OPEN OR CLOSE? 68
IS ACTUAL POSITION < PREDET. MAX. VALUE? 70
OPEN SIEVE 72
IS THE ACTUAL POSITION > PREDET. MIN. VALUE? 76
CLOSE SIEVE 78
B
C
STORE ACTUAL POSITION VALUE 74
60

METHOD OF OPERATION OF A SIEVE ADJUSTMENT CONTROL SYSTEM FOR AN AGRICULTURAL COMBINE

TECHNICAL FIELD

This invention relates generally to an adjustment control system for a grain cleaning sieve or sieves of an agricultural combine, and more particularly, to a method of automatic operation of a sieve control system for adjusting the sieve opening size or position while mitigating error and inaccuracy resulting from tolerance stack-up of mechanical components in the system.

BACKGROUND ART

It is well known to provide an automatic system for adjusting the sieve or sieves of the grain cleaning system of an agricultural combine. Typically, the cleaning system will consist of two sieves, an upper or coarser sieve or chaffer located below the threshing mechanism or separator of the combine and having larger sieve openings for the passage of grain and smaller pieces of plant material therethrough but relatively little of the larger chaff, and a lower finer sieve located below the chaffer for receiving the grain and smaller pieces of plant material therefrom and having smaller sieve openings for passage of the grain therethrough but relatively little of the plant material. The collected and cleaned grain, once through the sieves is then typically transported by conveyor or other means to a clean grain bin on the combine, or to an accompanying grain receiving vehicle. The opening sizes of the chaffer and sieve are an important parameters for controlling the amount or yield of grain that is recovered by the combine as opposed to discharged therefrom with the chaff and other unwanted plant material and crop residue. Accordingly, the chaffer and sieve opening sizes are typically set at the commencement of the harvesting operation, and may be reset at times during the harvesting operation, to achieve a desired crop yield rate.

A typical sieve construction includes a plurality of elongate parallel, pivotally mounted slats, each slat including a plurality of longitudinally spaced upwardly extending inclined fingers, the slats being pivotable through a range of open positions angularly oriented to horizontal for providing a corresponding range of openings or spaces between the fingers of adjacent ones of the slats. A typical automatic sieve adjusting system includes an adjusting member which contacts each of the slats, and a linkage and/or cable arrangement connected between the adjusting member and one or more actuators driven by an electrical, fluid, or other controller for moving the linkage or cable arrangement and member and thus changing the angular orientation of the slats and as a result, the opening size. The typical controller includes at least one processor operated by stored commands and/or inputs for controlling an electrical drive motor or the like for moving the actuator. An input device such as a push button or keypad and a display device are typically located in the operator cab of the combine for changing and showing the chaffer and sieve settings.

Typical sieve control systems are disclosed in Rowland-Hill et al. U.S. Pat. No. 4,466,231, issued Aug. 21, 1984 to Sperry Corporation; and Diekhans U.S. Pat. No. 6,205,384, issued Mar. 20, 2001 to Claas Selbstfahrende Erntemaschinen GmbH. U.S. Pat. No. 4,466,231 in particular discloses a method for automatic sieve and chaffer adjustment which ensures that the approach to the final position or setting is always made in the direction for opening the sieve, thereby allowing for compensation for play or backlash in the mechanical linkages of the system. However, to reduce the probability of the sieve or chaffer being damaged by crop material or foreign objects as it is moved to the setting, the sieve or chaffer is brought to a fully open position so as to pass any large and potentially damaging objects therethrough, then is moved in a closing direction to a more closed position past the desired setting by an amount corresponding to an anticipated amount of backlash or play in mechanical components of the system. Then, the sieve is opened by a corresponding amount to the desired setting. Possible shortcomings of this method of operation, however, include in the instance of a chaffer, the possible passage of larger pieces of plant material, such as stalk and stem fragments, into the openings of the chaffer so as to be caught or trapped therein or suspended therefrom, so as to decrease the capacity thereof as well as possibly also interfere with the operation of the sieve below, so as to reduce the capacity or efficiency of the cleaning system. In the instance of the lower finer sieve, if fully opened during the operation thereof when larger crop material is present thereon, the undesirable crop material can pass with the grain through the sieve so as to increase the percentage of impurities in the clean grain. This may be acceptable on an occasional basis. However, if it is desired to more frequently adjust the opening size of the finer sieve, for instance, such as for automatically maintaining a selected sieve opening size, more frequently fully opening the sieve may significantly increase the amount of unwanted crop material in the clean grain.

Accordingly what is sought is a system for automatically adjusting a sieve of an agricultural combine which overcomes many of the problems and shortcomings set forth above.

SUMMARY OF THE INVENTION

According to one aspect of the invention, a method of automatically controlling an opening size of a sieve of an agricultural combine is disclosed, which overcomes many of the problems and shortcomings identified above. The present method includes the steps of:

(a) storing a value for the opening size;

(b) determining an actual value for the opening size;

(c) comparing the actual value with the stored value, and,

- (i) if the actual value is at least a predetermined amount greater than the stored value, then automatically closing the sieve until the actual value equals the stored value;
- (ii) if the actual value is greater than the stored value by less than the predetermined amount, then automatically opening the sieve until the actual value is a predetermined amount greater than the stored value, then automatically closing the sieve until the actual value equals the stored value; and
- (iii) if the actual value is less than the stored value, then automatically opening the sieve until the actual value is a predetermined amount greater than the stored value and then automatically closing the sieve until the actual value equals the stored value.

Preferably, the predetermined amounts are each an amount which correspond to or is only slightly or marginally greater than the amount of the anticipated tolerance stack-up for, or play in, the mechanical components of the system. The typical range of opening sizes for a particular sieve will equal several times the cumulative tolerance stack-up or play for the mechanical components of the system, which provides the advantage when the selected opening size is relatively small or in the lower portion of the range, that the sieve is only further opened by a relatively small amount, thereby limiting the number of larger pieces of plant material or contaminants that may be passed through or could become jammed or lodged in the sieve or chaffer, and the amount of smaller crop residue that would pass through the finer sieve with the clean grain. Also, because the sieve is only open a relatively small amount greater than the desired opening size, the adjustment can be completed in a time period shorter than required for opening the sieve from a smaller opening size to the fully opened position, closing the sieve to an opening size smaller than the desired size, then opening the sieve to the desired opening size, such as disclosed in U.S. Pat. No. 4,466,231.

As a preferred optional step, the sieve can be opened or closed to a commanded opening size, then a value for the commanded opening size stored for use as the stored value. Also preferably, during the prior step, the threshing mechanism or separator of the combine is not operating, such that any substantial flow of material therefrom to the sieve is absent. This allows the sieve to be moved, for instance, using an operator input device such as a push button or keypad, in an opening direction, a closing direction, or alternatively in both, for setting the sieve to a desired opening size without risk of becoming jammed with material therein or too large of material passing therethrough. Then, steps (a), (b) and (c) can be performed during the operation of the sieve when a flow of material from the separator is present, for making minor size adjustments for maintaining the sieve opening size at the desired value or setting.

DETAILED DESCRIPTION OF THE INVENTION

Figure 1:
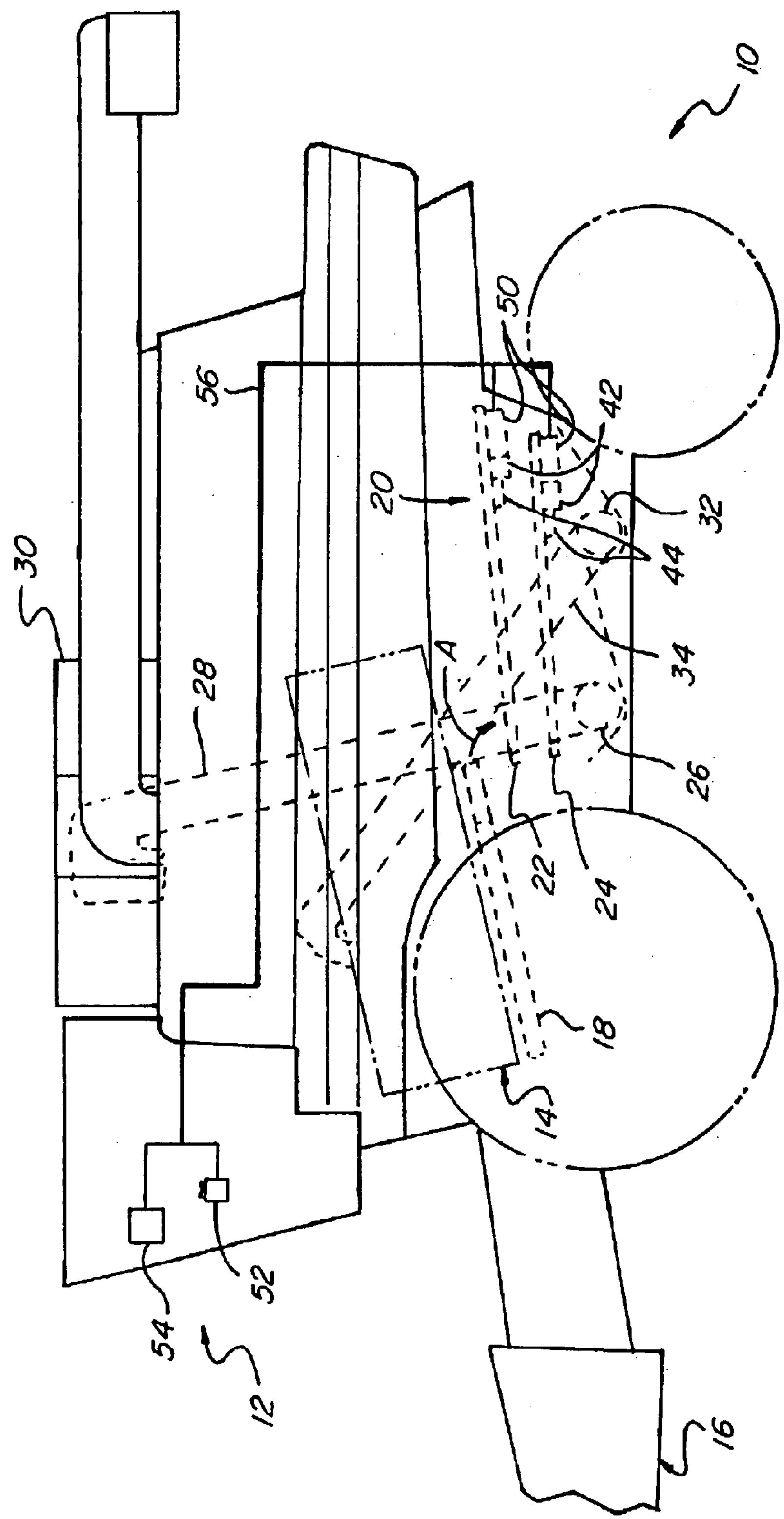
FIG. 1 is a simplified side elevational view of an agricultural combine including a sieve adjustment control system operable according to the method of the present invention.

Referring now to the drawings, in FIG. 1 a conventional agricultural combine 10 is shown including a sieve adjustment control system 12 operable according to the teachings of the present method. Agricultural combine 10 generally includes a threshing mechanism or separator 14 operable for receiving crop material from a harvesting mechanism 16 and separating smaller grains, seeds, pods and related plant material from larger stalks, stems, leaves, husks and other elements of the crop material, as well as vines, weeds and the like which may be present in the harvested crop material. The smaller material falls from separator 14 into one or more augers 18 disposed below separator 14, which collect the smaller material and convey it to a cleaning system 20. Cleaning system 20 includes an upper, coarser sieve or chaffer 22 positioned for receiving the material from auger or augers 18, as denoted by arrow A, and a lower, finer sieve 24 which receives grain or seeds which pass through chaffer 22. Sieve 24, in turn, separates or cleans the grain or seed from the remaining other material, such as pod fragments and the like, for collection by a lower auger 26 which conveys the clean grain or seeds to an elevator 28 which conveys the clean grain or seeds upwardly to a clean grain bin 30. Chaffer 22 and sieve 24 are vibrated or reciprocated during operation by suitable means (not shown) for facilitating sifting of the crop material therethrough. Material which does not pass through is moved rearwardly on chaffer 22 or sieve 24 by the vibration or reciprocal action and is either blown or drops from the rear end thereof through an opening in the rear of combine 10 or into a return auger 32 and be carried to a return elevator 34 for conveyance back to separator 14.

Figure 2:
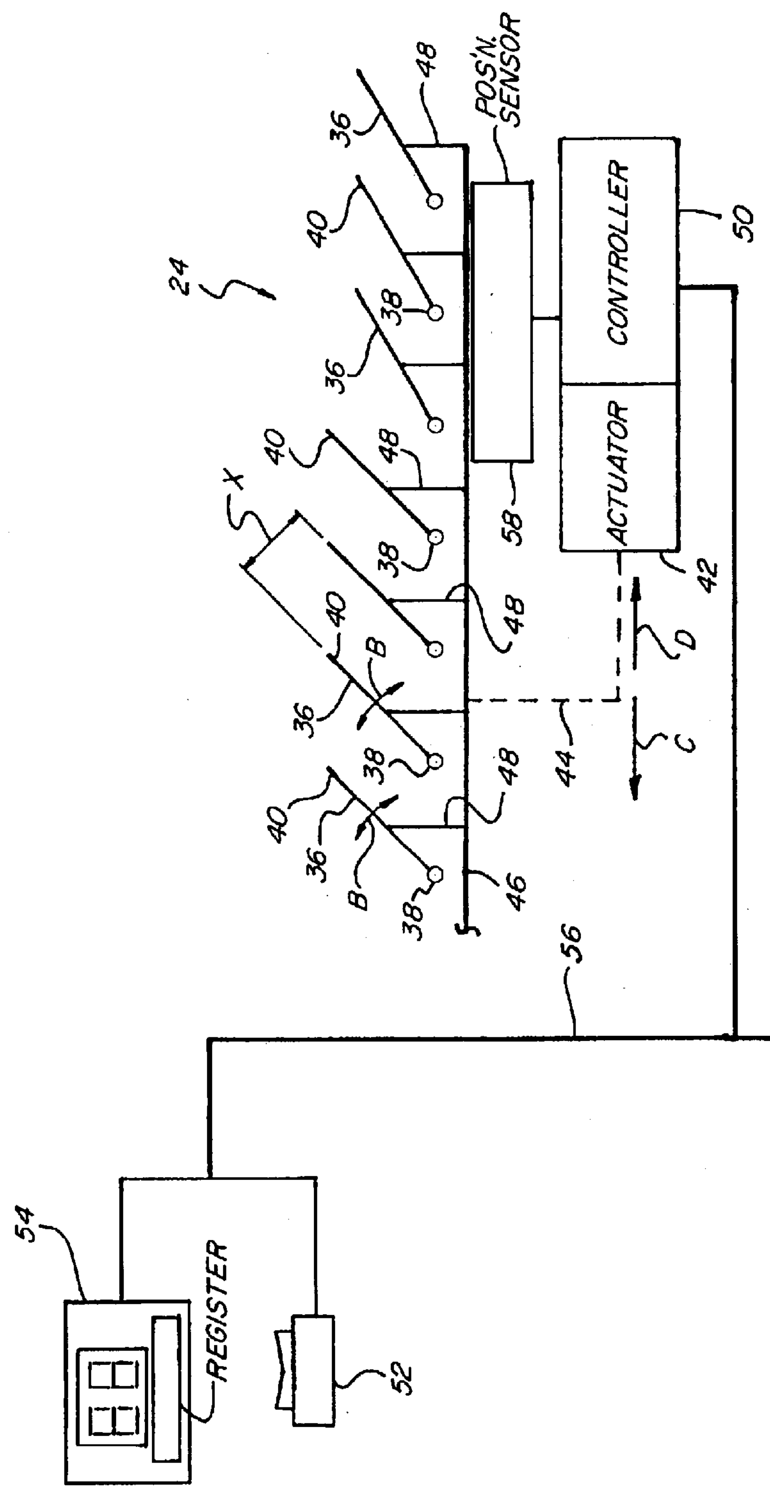
FIG. 2 is a simplified schematic diagram of the control system.

Referring also to FIG. 2, chaffer 22 and sieve 24, represented by sieve 24, each include a plurality of elongate, horizontally extending slats 36, each slat being pivotable about a generally horizontal pivotal axis 38. Each slat 36 is composed of a plurality of parallel, longitudinally spaced upward and downwardly inclined fingers 40, the fingers 40 of adjacent ones of slats 36 defining sieve openings therebetween, represented by distance X in FIG. 2, for the passage of only plant material of a desired maximum size therethrough. Slats 36 are simultaneously pivotable about respective pivotal axes 38 through a range of pivotable positions for varying the opening size X of the sieve in the well known conventional manner, as denoted by arrows B. In this regard, slats 36 would be pivoted in a counterclockwise direction to increase the opening size X, and pivoted in the clockwise direction for decreasing the opening size X.

Sieve adjustment control system 12 is operable for automatically and simultaneously moving slats 36 through a predetermined range of pivotal positions for varying the opening size of sieve 24, and for holding slats 36 at a position corresponding to a desired or selected opening size. To accomplish this, system 12 preferably includes at least one actuator 42, such as, but not limited to, a conventional electric linear actuator (ELA). Actuator 42 can be connected by a suitable mechanical connecting element such as one or more cables and/or linkages, to an adjusting member 46 of sieve 24. Adjusting member 46 will typically include a plurality of upwardly extending portions 48 which contact and support slats 36 for pivotal movement about pivotal axis 38 thereof, respectively, adjusting member 46 being linearly movable by connecting element 44 in the direction denoted by the arrow C for moving slats 36 in an opening direction, and in the direction denoted by the arrow D for moving slats 36 in a closing direction. Accordingly, actuator 42 is precisely controllably movable in a corresponding linear manner in the direction C for effecting movement of connecting element 44 and adjusting member 46 and thus slats 36 in the opening direction, and in direction D for effecting movement of connecting element 44, adjusting member 46 and slats 36 in the closing direction.

Actuator 42 can be controlled using any suitable conventional controller, such as, but not limited to, controller 50 shown including at least one microprocessor and related circuitry drivingly connected to a motor connected to actuator 42 and operable for moving actuator 42 in the direction C and D, or holding actuator 42 at a selected position. Controller 50 is conventionally operable for moving actuator 42 based upon commands received from a suitable input device 52 which can be, for instance, a conventional push button or keypad device, or another input device, or a stored command or value contained in a suitable memory or register, such as a register of a display device 54, input device 52 and display device 54 being connected to controller 50 by a suitable conductive path 56 such as a conventional wiring harness or the like. Input device 52 and display device 54 will typically be located in an operator cab of combine 10. Information representative of a position of actuator 42, adjusting member 46, fingers 40 and/or slats 36, which in turn, is representative of the sieve position or opening size, is determined by a suitable position sensor 58 and is accessible or readable by controller 50 via conductive path 56. Controller 50 is then operable to compare information representative of a commanded or stored position or opening size from device 52 or 54, with information representative of an actual or sensed position or opening size as determined by position sensor 58, and controllably operate the motor of controller 50 for holding or moving actuator 42 and thus connecting element 44, adjusting member 46 and slats 36.

Here, it should be noted that structurally and operationally, chaffer 22, is an analogous device to sieve 24, that is, it is also a sieve, and can be automatically controlled by control system 12, utilizing a second actuator 42, mechanical connecting element 44, controller 50 and position sensor 58 operable in the above-described manner, or by a second control system 12, or other control system, as desired. In the former instance, a suitable switch or other means can be provided on the operator cab or at another desired location to allow switching devices 52 and 54 between chaffer 22 and sieve 24, as desired or required.

In a sieve such as chaffer 22 or sieve 24, the various mechanical apparatus thereof, represented by slats 36, fingers 40, connecting elements 44, adjusting members 46 and upwardly extending portions 48, are all manufactured to dimensions within certain tolerance ranges. There may also be play designed into the components of these elements and connections therebetween. Actuator 42 may also be operable for holding or moving to a position within a known range. The cumulative value of all, or selected ones, of these tolerances, play and range, can comprise what is referred to herein as a tolerance stack-up.

In operation, at the commencement of a harvesting operation, or at a desired time during the operation, the operator may view the information displayed by display device 54 representative of the opening size or position of slats 36 of chaffer 22 or sieve 24. Based on the displayed information, the operator may elect or determine to change the opening size by changing the position of slats 36, and initiate such change using input device 52.

Figure 3A:
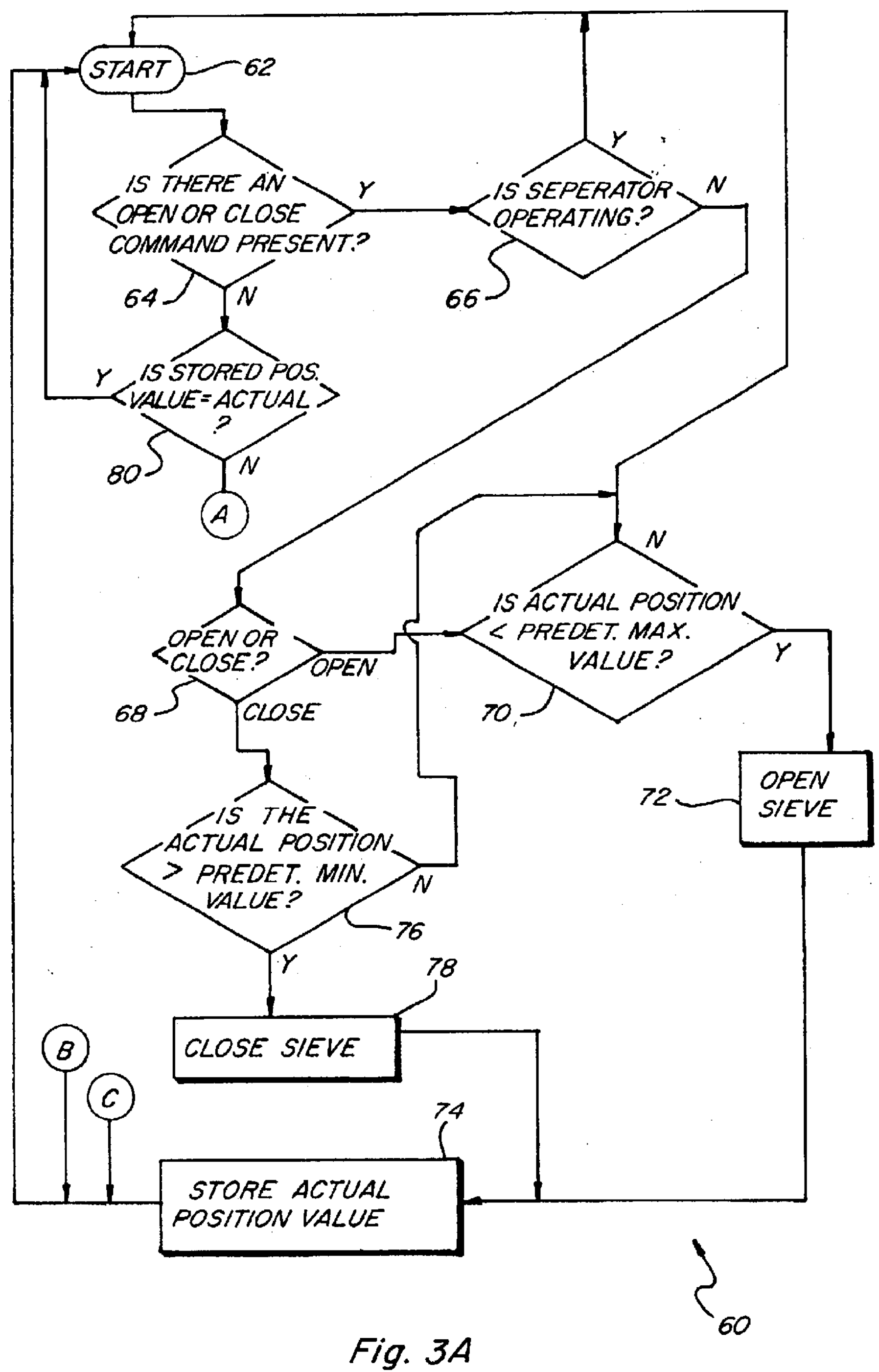
FIG. 3A is a high level flow diagram showing steps of the method of the invention.
Figure 3B:
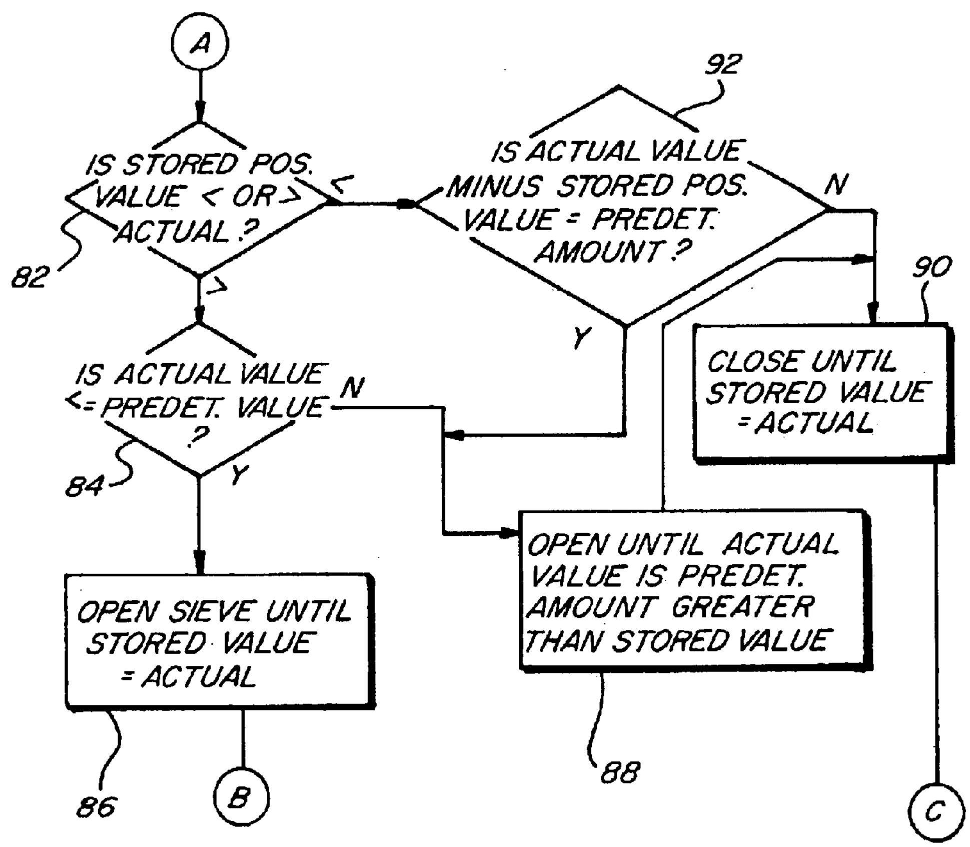
FIG. 3B is a continuation of the flow diagram of FIG. 3A.

Referring also to FIGS. 3A and 3B, a high level flow diagram 60 of steps of a preferred method of the present invention are shown. According to the preferred method, after initiation of operation as denoted at start block 62, controller 50 determines whether an open or close command from input device 52 is present, as shown by decision block 64. If an open or close command is present, controller 50 will determine whether separator 14 is operating or not, as shown at decision block 66. As long as separator 14 is operating, controller 50 will loop back to start block 62 and decision block 64. If separator 14 is not operating, or ceases operating, and an open or closed command is present, controller 50 will then determine whether the command is an open or close command, as denoted by decision block 68. If the command is an open command, controller 50 will determine whether the actual or current position is less than a predetermined value, preferably corresponding to a maximum opening size or position as denoted at decision block 70. If the actual position is not less than the predetermined value corresponding to the maximum opening size or position (predetermined maximum value), controller 50 will loop back to start block 62. If the actual position is less than the predetermined maximum value, controller 50 will operate actuator 42 to move in an opening direction, as denoted at block 72, to effect a corresponding movement of connecting element 44, adjusting member 46 and slats 36, until a desired opening size or position of slats 36 is reached, which will be indicated by display device 54. Here, it should be noted that the open command can be the result of an inputted value, that is, a desired value inputted via input device 52 if a keypad, or if a push button device, by holding the push button in a particular position until a desired value is displayed by display device 54. Alternatively, the input command could be recalled from the register or display device 54 or automatically determined by controller 50, as desired. When actuator 42 has opened the sieve sufficiently to achieve the desired or commanded opening size or position as determined or sensed by sensor 58 and displayed by device 54, that size or position can be held, and information or a value representative of the actual opening size or position stored in the register of device 54, as denoted at block 74, and controller 50 will loop back to start block 62.

Referring again to block 68, if it is determined that the command is a close command, controller 50 will determine if the actual opening size or position of slats 36 is greater than a predetermined value, preferably a minimum value representative of a minimum open position or a closed position, as denoted at decision block 76. If the actual opening size or position is not greater than the predetermined value representative of the minimum open position or closed position (predetermined minimum value), then controller 50 will loop back to start block 62. If the actual opening size or position is greater than the predetermined minimum value, then controller 50 will controllably operate actuator 42 to move the sieve in the closing direction, as denoted at block 78, until the commanded or desired opening size or position is reached. The actual position value determined or sensed by sensor 58 will then be stored in the register of display device 54 as denoted at block 74 and controller 50 will return to block 62.

In the absence of an open or close command, as determined at block 64, controller 50 will proceed to compare the then existing stored position value with the actual position value, as denoted at block 80. If those values are equal, controller 50 will return to block 62. If those values are not equal, controller 50 will determine whether the stored value is less than or greater than the actual value, as denoted at decision block 82 in FIG. 3B. If the stored position value is greater than the actual value, controller 50 will next determine whether the actual value equals a predetermined value, as denoted at decision block 84, which is preferably a predetermined high value. If the actual value equals this predetermined high value, then controller 50 will operate actuator 42 in an open direction until the stored value and the actual value are equal, as denoted at block 86, and then will return to block 62. If the actual value does not equal the predetermined high value, then controller 50 will operate actuator 42 in the opening direction until the actual value is a predetermined amount greater than the stored value, as shown at block 88. This predetermined amount greater than the stored value preferably corresponds to or is marginally or slightly greater than the tolerance stack-up, or may be some other desired value. Then, controller 50 will operate the actuator in the closing direction until the stored value and the actual value are equal, as denoted at block 90, and return to block 62.

Referring again to block 82, if controller 50 determines that the stored position value is less than the actual value, it will next determine if the difference between the actual position value and the stored position value equals another predetermined value, as denoted at decision block 92. If yes, controller 50 will operate actuator 42 in the opening direction until the actual value is the predetermined amount greater than the stored value, as shown at block 88, then will operate actuator 42 in the closing direction until the stored position value equals the actual value, as shown at block 90 and then return to start block 62. If, at block 92, the difference between the actual value and the stored position value does not equal the predetermined value, then controller 50 will operate actuator 42 in the closing direction until the stored value and the actual value are equal, as shown at block 90, and then return to block 62.

Thus, according to the method of the present invention two routines are utilized for controlling sieve opening size, one for opening or closing the sieve to reach a commanded position or opening size, and a second routine for monitoring a value representative of an actual sieve position or opening size and if greater than or less than a stored value, then effecting a change in the sieve position or opening size such that the actuator value will equal the stored value. In this latter routine, if the stored value is less than the actual value by at least a predetermined amount, which amount, again, preferably corresponds to or is slightly greater than the tolerance stack-up, the sieve will be actuated to move in a closing direction to reach the position or opening size corresponding to the stored value; if the stored value is not at least the predetermined amount less than the actual value, the sieve will be actuated to open until the actual value is the predetermined amount greater than the stored value, then closed until the stored value and actual value are equal. On the other hand, if the stored value is greater than the actual value but not equal to a predetermined value, preferably a maximum value, the sieve will be opened until the actual value is a predetermined amount greater than the stored value then closed until the actual value and the stored value are equal. In this way, when adjusting the sieve position or opening size to correspond to the stored value, the sieve is always moved in a closing direction by at least the predetermined amount which preferably corresponds to at least the amount of the tolerance stack-up for the mechanical components of the system.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method of automatically controlling an opening size of a sieve of an agricultural combine, comprising the steps of:

(a) storing a value for the opening size;

(b) determining an actual value for the opening size; and (c) comparing the actual value with the stored value, and, (i) if the actual value is at least a predetermined amount greater than the stored value, then automatically closing the sieve until the actual value equals the stored value;

(ii) if the actual value is greater than the stored value by less than the predetermined amount, then automatically opening the sieve until the actual value is the predetermined amount greater than the stored value, then automatically closing the sieve until the actual value equals the stored value; and (iii) if the actual value is less than the stored value, then automatically opening the sieve until the actual value is the predetermined amount greater than the stored value and then automatically closing the sieve until the actual value equals the stored value.

2. The method of claim 1 comprising a step prior to the step (a) of opening or closing the sieve to a commanded opening size then storing a value for the commanded opening size as the stored value.

3. The method of claim 2 wherein the sieve is opened or closed to the commanded opening size only in an absence of a flow of material from a separator of the combine to the sieve.

4. The method of claim 1 wherein a condition for the occurrence of the steps (a), (b) and (c) is an absence of a command to change the opening size of the sieve.

5. The method of claim 1 wherein prior to step (a) if a command to change the opening size of the sieve is present and a separator of the combine is determined to be not operating, then the opening size will be changed to the commanded opening size and the value stored in step (a) will correspond to the commanded opening size.

6. The method of claim 1, wherein the sieve is a chaffer of the combine.

7. The method of claim 1, wherein the predetermined amount is about equal to or is slightly greater than a tolerance stack-up for the sieve.

8. A method for automatically adjusting an opening size of a sieve of an agricultural combine, the combine including at least one actuator connected to movable elements of the sieve and operable for automatically moving the movable elements for adjusting the opening size, a controller operatively connected to the at least one actuator, and a memory for storing a value corresponding to an opening size of the sieve, the method comprising the steps of:

(a) storing a desired value for the opening size in the memory;

(b) determining an actual value for the opening size; and (c) comparing the actual value to the stored value, and (i) if the actual value is greater than the stored value by at least a predetermined amount, then automatically operating the at least one actuator for moving the movable elements for closing the sieve until the actual value equals the stored value;

(ii) if the actual value is greater than the stored value by less than the predetermined amount, then automatically operating the at least one actuator for moving the movable elements for opening the sieve until the actual value is the predetermined amount greater than the stored value, then automatically operating the at least one actuator for moving the movable elements for closing the sieve until the actual value equals the stored value; and (iii) if the actual value is less than the stored value, then automatically operating the at least one actuator for moving the movable elements for opening the sieve until the actual value is the predetermined amount greater than the stored value and then automatically operating the at least one actuator for moving the movable elements for closing the sieve until the actual value equals the stored value.

9. The method of claim 8, comprising a step prior to steps (a), (b) and (c), of using an input device to operate the at least one actuator to move the sieve to the desired opening size.

10. The method of claim 8, wherein the comparing step is performed only in the absence of a command to change the opening size.

11. The method of claim 8, wherein the sieve is a chaffer of the combine.

12. The method of claim 8, wherein the predetermined value is about equal to a tolerance stack-up for mechanical apparatus for adjusting the sieve.

13. A method for maintaining an adjustable sieve of an agricultural combine at a selected open position within a predetermined range of open positions, comprising the step of:

monitoring a value corresponding to an actual open position of the sieve; and if the value corresponding to the actual open position is at least a predetermined amount greater than a value corresponding to the selected open position, then moving the sieve in a closing direction to the selected open position, and if the value corresponding to the actual open position is less than the predetermined amount greater than the value corresponding to the selected open position or is less than the value corresponding to the selected open position, then moving the sieve in an opening direction to a position having a value the predetermined amount greater than the value corresponding to the selected open position, then moving the sieve in the closing direction to the selected open position.

14. The method of claim 13 wherein the step is performed only in the absence of a command to change the open position.

15. The method of claim 13 comprising steps prior to the monitoring step, of selecting the selected open position, moving the sieve to the selected open position, and storing a value corresponding thereto.

16. The method of claim 15 wherein the prior steps are performed only when a separator of the combine is not operating.

17. The method of claim 13, wherein the sieve comprises a chaffer.

18. A method of automatically operating a sieve of an agricultural combine, comprising the steps of:

(a) setting the sieve to a desired opening size and storing a value for the desired opening size; then automatically:

(b) determining an actual value for the opening size; and (c) comparing the actual value with the stored value, and, (i) if the actual value is at least a predetermined amount greater than the stored value, then closing the sieve until the actual value equals the stored value;

(ii) if the actual value is greater than the stored value by less than the predetermined amount, then opening the sieve until the actual value is the predetermined amount greater than the stored value, then closing the sieve until the actual value equals the stored value; and (iii) if the actual value is less than the stored value, then opening the sieve until the actual value is the predetermined amount greater than the stored value and then closing the sieve until the actual value equals the stored value.

19. The method of claim 18 wherein the sieve is a chaffer of the combine.

20. The method of claim 18 where in step (a) the sieve is set by an operator.

21. The method of claim 20 wherein the sieve is set using a push button or key pad device in an operator cab of the combine.

22. The method of claim 21, wherein the value for the desired opening size is stored in a memory of a display device.

23. The method of claim 18, wherein the predetermined amount is at least equal to a cumulative amount of tolerances for mechanical components of adjusting apparatus for the sieve.

* * * * *